July 12, 1960  F. G. PARIS ET AL  2,944,391
RAM-JET UNIT
Filed June 27, 1957  2 Sheets-Sheet 1
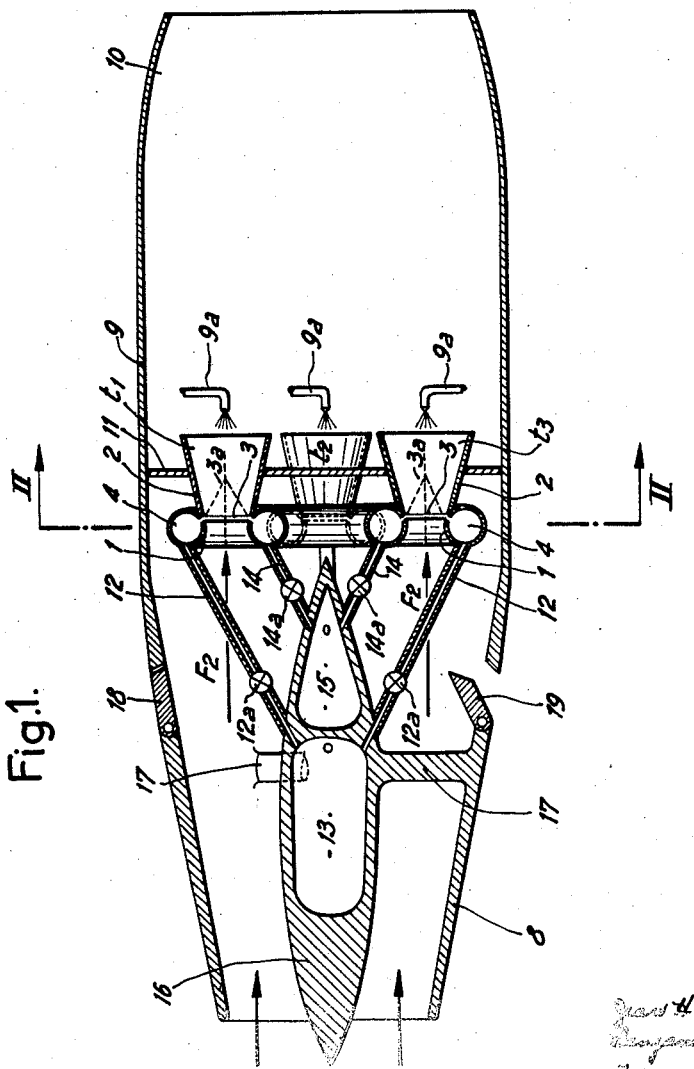
INVENTORS
Jean H. Bertin
Benjamin J. M. Salmon
François G. Paris
Watson, Cole, Grindle & Watson
ATTORNEYS July 12, 1960

F. G. PARIS ET AL 2,944,391

RAM-JET UNIT

Filed June 27, 1957

2 Sheets-Sheet 2

INVENTORS
Jean H. Bertin
Benjamin J. M. Salmon
Francois G. Paris
BY Watson, Cole, Grindle & Watson
ATTORNEYS

United States Patent Office 2,944,391
Patented July 12, 1960

2,944,391

RAM-JET UNIT

Francois Gilbert Paris, Garches, Jean Henri Bertin, Neuilly-sur-Seine, and Benjamin Jean Marcel Salmon, Suresnes, all of France, assignors to Societe Bertin & Cie, Paris, France, a French company Filed June 27, 1957, Ser. No. 668,388

Claims priority, application France June 29, 1956

7 Claims. (Cl. 60—35.6)

The present invention relates to ram-jet units used for propelling aircraft or the like, and more specifically to ram-jet units equipped with air entraining or ejector systems designed to accelerate the motive flow through the unit and improve its operative conditions especially at low speeds.

An object of this invention is to provide such an ejector system in combination with a ram-jet unit, which will not only augment the thrust when operated, but also cause but slight pressure losses when at rest while the ram-jet unit operates in the conventional manner.

A further object of this invention is to allow for a considerable reduction in over-all length of the power plant as compared with conventional ram-jet units of similar output.

Figure 4:
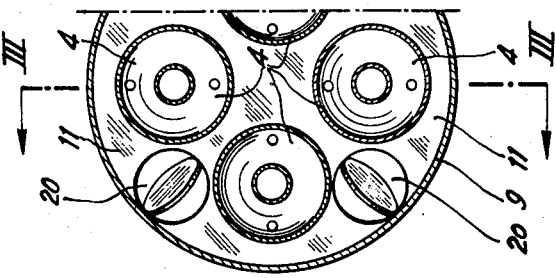
Figure 3:
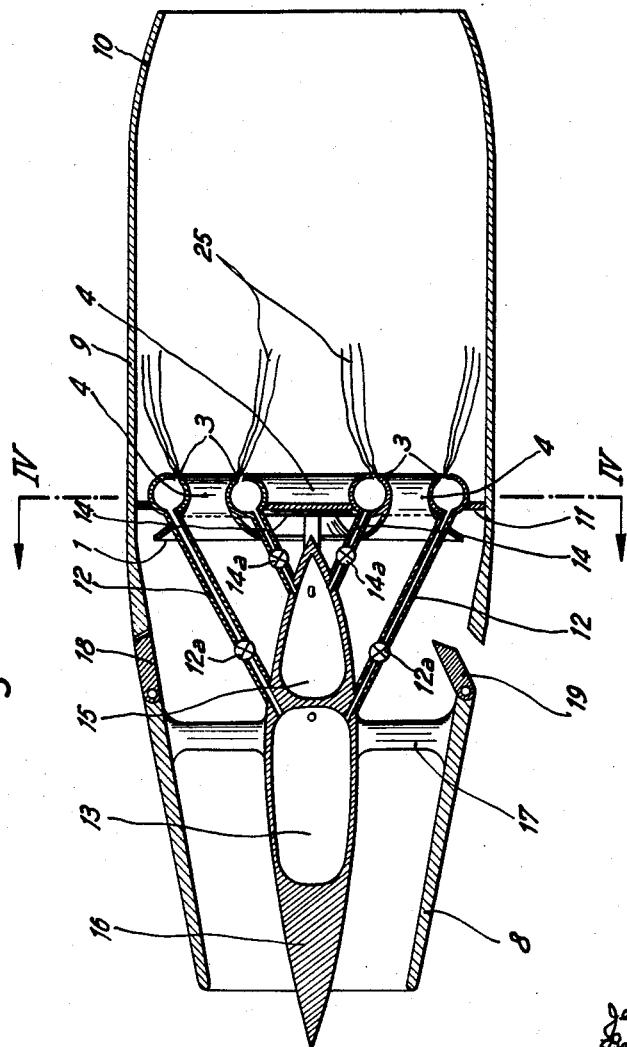

In the accompanying drawings:

Figure 1 is an axial section of a first embodiment of ram-jet unit according to the invention, Figure 2 is a section along line II—II of Figure 1, Figure 3 is a modification comprising an ejector of the divergent fluid wall type, Figure 4 is a section on line IV—IV of Figure 3.

Figures 1 and 2 show a ram-jet unit comprising in succession, a ramming air intake or diffuser 8, a combustion chamber bounded by a generally cylindrical wall 9 and a propelling nozzle 10 designed to form a thrust-providing jet.

In accordance with a feature of the present invention, a number of ejector tubes or nozzles (four in the example of the drawing) $t_1$, $t_2$, $t_3$ . . . are arranged between the diffusor 8 and the combustion chamber 9, across a partition 11 provided upstream of this chamber in such a manner that the atmospheric air has to pass through the said tubes or nozzles as indicated by the arrows F2, in order to flow from the diffusor to the combustion chamber.

Each of the nozzles comprises a convergent entrance portion 1 and a divergent exit portion 2. On the inner wall surface of the tube thus constituted in the region of the throat or slightly downstream thereof, an annular duct 3 opens about the axis of the said tube, the shape of which duct is approximately that of a cone which would have its apex at 3a on the said axis. This duct communicates with an annular manifold 4 which supplies the said duct with fluid under pressure in order to form the energizing jet. The nozzles $t_1$, $t_2$, $t_3$ . . . form together a compressor which raises the pressure in the combustion chamber 9. The fuel to be burnt in the chamber 9 may be introduced by means of injectors 9a conveniently disposed either in the flow passing through these nozzles or slightly downstream thereof as indicated by way of example in Figure 1. The whole or part of this fuel may alternatively be introduced into the energizing fluid for example into the manifolds 4.

The inducting jets may alternatively be constituted by the exhaust gases of rockets. An embodiment of this kind is illustrated in Figure 1 where each one of the collectors 4 constitutes the combustion chamber of a rocket. For this purpose a pipe 12 supplying the oxidizer from a reservoir 13 and a pipe 14 supplying the fuel from a reservoir 15 lead into each manifold 4, the reservoirs 13 and 15 being arranged in a streamlined central body 16 placed at the entry of the diffusor and supported by radial arms 17. The fuel and the oxidizer are so chosen as to form together a "hypergolic" mixture which ignites spontaneously, for example the fuel may be kerosene and the oxidizer nitric acid. It is important that the fuel is the same as that injected directly into the combustion chamber of the ram-jet unit so that even without the use of rockets it suffices to preserve a moderate supply of fuel in the conduits 12 for assuring the functioning of the ram-jet unit. The tubes 12 and 14 are each provided with a valve 12a, 14a operated periodically in any convenient manner to successively make and break the supply lines.

Thus a periodic combustion is produced in each of the manifolds 4, and the high energy gases evolving from this combustion form the inducting jet at the outlet of each of the annular ducts 3.

The propulsion effect attained by thus using the exhaust gases of rockets for supplying the chamber 9 and nozzle 10 is greater than that which could be attained by directly using the exhaust gases of the said rockets for propulsion. A range of economical operations may be obtained for certain flight cases of medium thrust and low speed, by not effecting any combustion in the chamber 9 and by being satisfied with the energy supplied by the rockets.

By burning fuel in the chamber 9 the power developed is increased, for example for the take-off and for attaining high flight speeds.

It is advantageous if the nozzles $t_1$, $t_2$, $t_3$ . . . in as high as possible a number function with a certain phase offset in order to regularise the final flow in the combustion chamber of the ram-jet unit as well as the flow induced by these nozzles in the diffusor. For this purpose in the embodiment described it suffices to control the functioning of the obturators 12a, 14a associated in the various manifolds 4 with a suitable sequence.

The tore shape illustrated for the manifolds 4 is only a particular case which may offer advantages when the manifold or manifolds are the seat of a rocket combustion, but the manifolds may have any other shape.

For the case of slow flight one may provide auxiliary flaps for the entry of air in the vicinity of the maximum cross-section of the diffusor 8 in such a manner as to permit the nozzles to aspirate without pressure drop the great mass flow necessary for the improvement of propulsive output at low flight speeds. Such flaps are illustrated in Figure 1, one of them, 18, in the closed position, the other one, 19, in the open position. They are biased towards the closed position by springs not shown.

On the other hand the partition 11 comprises preferably at least one orifice 20 (Figure 2) which may be opened in order to increase the total output in the case of flight at high speed.

From the fact that the nozzles are arranged in the interior of the ram-jet unit just upstream of the combustion chamber, and that they accordingly aspire air which has already passed through the diffusor of the ram-jet unit, several advantages are derived:

(a) The diffusor of the ram-jet unit remains simple and can be given the best possible characteristics as a diffusor, the output of this member affecting directly that of the ram-jet unit, as well known.

(b) The nozzles may serve as flame holders or as a ramp for the injection of the fuel.

(c) Even if the combustion is stopped downstream of the nozzles, the latter preserve a good output not only at stationary conditions but also at high speed, owing to the fact that the inducting jets of the nozzles expand first therethrough to the pressure level generated by the diffusor of the ram-jet unit, and then through the propulsion nozzle of the unit together with the air which had passed directly through the same and has been subject to the action of the nozzles. This expansion in two stages is advantageous.

The modification of Figures 3 and 4 differs from the preceding embodiment in that at least part of the divergent portions of the nozzles is bounded not by a solid wall but by a fluid sheet. This type of ejector nozzle with a divergent fluid wall has been described in United States application Serial No. 624,811, filed November 28, 1956 now Patent No. 2,922,277. This fluid wall shown at 25 in Figure 3 is formed in the case in consideration by the inducting jet itself which issues from the annular conduit 3 of each of the nozzles.

In such a case the nozzles are reduced to the inner surface of the annular manifolds when the inducting jets are stopped.

I claim:

1. In a ram-jet unit having a ramming intake directed forward and designed to convert velocity of intake air into pressure, and a combustion chamber supplied with air providing from said ramming intake, an air pressure raising ejector device comprising a pipe extending between the downstream end of said ramming intake and the upstream end of said combustion chamber to interconnect the same, said pipe having an upstream convergent section opening into said downstream end of the ramming intake, an annular slot-like nozzle extending around said pipe, downstream of the convergent section thereof, and opening in a direction inclined downstream, and means for supplying pressure fluid to said annular nozzle to form a motive jet inducing compressed air from the downstream end of said ramming intake and discharging it into said combustion chamber with an increased pressure.

2. Ram-jet unit as claimed in claim 1, comprising a partition wall across said unit, separating the ramming intake from the combustion chamber, the pipe extending through said wall to interconnect said intake and chamber.

3. Ram-jet unit as claimed in claim 2, comprising an additional passage through the partition wall, by-passing the pipe, and controllable means for obturating said passage.

4. Ram-jet unit as claimed in claim 2, comprising a plurality of pipes extending through the partition wall in spaced relationship with each other and in symmetrical distribution about the axis of the unit.

5. Ram-jet unit as claimed in claim 4, comprising a fuel injector in the combustion chamber, opposite each pipe.

6. Ram-jet unit as claimed in claim 1, wherein the pipe is bounded by a solid annular wall of generally convergent shape, and the slot-like nozzle is inclined in a direction substantially tangent to said annular wall and diverging from the axis thereof, whereby a divergent annular jet is formed which extends the solid convergent wall.

7. Ram-jet unit as claimed in claim 1, wherein the pipe comprises a solid annular wall of generally divergent shape downstream of and extending an annular wall of generally convergent shape, the annular slot-like nozzle being located at the junction of said walls.

References Cited in the file of this patent

UNITED STATES PATENTS

| | | |
|---|---|---|
| 2,412,825 | McCollum | Dec. 17, 1946 |
| 2,419,866 | Wilson | Apr. 29, 1947 |
| 2,699,906 | Lee et al. | Jan. 18, 1955 |
| 2,705,396 | Boyce et al. | Apr. 5, 1955 |
| 2,735,263 | Charshafian | Feb. 21, 1956 |